United States Patent
Rusek et al.

(10) Patent No.: US 11,405,089 B2
(45) Date of Patent: Aug. 2, 2022

(54) METHOD AND SYSTEM FOR MANAGING INTERFERENCE IN MULTI TRP SYSTEMS

(71) Applicant: Sony Corporation, Tokyo (JP)

(72) Inventors: Fredrik Rusek, Lund (SE); Olof Zander, Lund (SE); Zuleita Ho, Lund (SE); Erik Bengtsson, Lund (SE); Kun Zhao, Lund (SE); Torgny Palenius, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/279,234

(22) PCT Filed: Sep. 27, 2019

(86) PCT No.: PCT/US2019/053485
§ 371 (c)(1),
(2) Date: Mar. 24, 2021

(87) PCT Pub. No.: WO2020/069333
PCT Pub. Date: Apr. 2, 2020

(65) Prior Publication Data
US 2021/0409090 A1 Dec. 30, 2021

(30) Foreign Application Priority Data
Sep. 28, 2018 (SE) .................................. 1830273-7

(51) Int. Cl.
*H04B 7/04* (2017.01)
*H04B 7/06* (2006.01)
(Continued)

(52) U.S. Cl.
CPC ........... *H04B 7/0695* (2013.01); *H04B 7/024* (2013.01); *H04B 7/0421* (2013.01);
(Continued)

(58) Field of Classification Search
CPC .......... H04B 7/02; H04B 7/022; H04B 7/024; H04B 7/04; H04B 7/0404; H04B 7/0413;
(Continued)

(56) References Cited

U.S. PATENT DOCUMENTS 10,548,144 B2 * 1/2020 Soriaga ................ H04B 7/0671
11,246,050 B2 * 2/2022 Zhang .................. H04L 5/0051
(Continued)

FOREIGN PATENT DOCUMENTS

JP    2010171733 A    8/2010
JP    2012074884 A    4/2012
(Continued)

OTHER PUBLICATIONS

International Search Report and Written Opinion from corresponding International Application No. PCT/US2019/053485 dated Nov. 28, 2019, 12 pages.
(Continued)

*Primary Examiner* — Siu M Lee
(74) *Attorney, Agent, or Firm* — Tucker Ellis LLP

(57) ABSTRACT

Systems and methods for managing interference in a communication network include transmitting a first downlink signal from a first transmit/receive point (TRP) to an electronic device using a beam. The electronic device can also receive a second downlink signal from a second TRP, where a portion of the first downlink signal from the first TRP interferes with the second downlink signal. The first TRP then receives a series of uplink pilot signals from the electronic device. Using the received uplink pilot signals, the first TRP can then estimate the angle of departure (AoD) for the intended signal (first downlink signal), and the AoD for the interference signal. The first TRP can then reconfigure the beam used to transmit the first downlink signal based on the estimated AoDs for the intended signal and interference signal to manage the interference effect that the first leakage signal has on the second downlink signal.

16 Claims, 7 Drawing Sheets

(51) Int. Cl.
*H04B 7/024* (2017.01)
*H04B 7/0417* (2017.01)
*H04W 36/06* (2009.01)
*H04W 72/04* (2009.01)

(52) U.S. Cl.
CPC .......... *H04B 7/0632* (2013.01); *H04W 36/06* (2013.01); *H04W 72/046* (2013.01)

(58) Field of Classification Search
CPC .. H04B 7/0421; H04B 7/0632; H04B 7/0695; H04W 36/06; H04W 72/046
See application file for complete search history.

(56) References Cited

U.S. PATENT DOCUMENTS

| | | |
|---|---|---|
| 2011/0098054 A1 | 4/2011 | Gorokhov et al. |
| 2016/0270087 A1* | 9/2016 | Soriaga ................. H04W 16/28 |

FOREIGN PATENT DOCUMENTS

| | | |
|---|---|---|
| JP | 2013520073 A | 5/2013 |
| JP | 2013535140 A | 9/2013 |
| JP | 2015012345 A | 1/2015 |
| JP | 2018512791 A | 5/2018 |
| JP | 2018513596 A | 5/2018 |
| WO | 2015169358 A1 | 11/2015 |
| WO | 2017095467 A1 | 6/2017 |
| WO | 2018127181 A1 | 7/2018 |

OTHER PUBLICATIONS

Office Action from corresponding Swedish Application No. 1830273-7 dated Apr. 8, 2019.

Mitsubishi Electric, "Exploiting channel reciprocity in TDD/MIMO with asymmetric interference", 3rd Generation Partnership Project (3G99), Mar. 2009, Seoul, Korea, 6 pages.

Office Action from corresponding Japanese Application No. 2021-517600 dated Jun. 14, 2022.

* cited by examiner

METHOD AND SYSTEM FOR MANAGING INTERFERENCE IN MULTI TRP SYSTEMS

RELATED APPLICATION DATA

This application claims the benefit of Swedish Patent Application No. 1830273-7 filed Sep. 28, 2018, the disclosure of which is incorporated herein by reference in its entirety.

TECHNICAL FIELD OF THE INVENTION

The technology of the present disclosure relates generally to wireless communications among electronic devices in a network environment and, more particularly, to a method and apparatus for managing interference in systems with multiple transmit/receive points communicating with an electronic device.

BACKGROUND

Demand for data traffic on wireless communication system continues to increase. Since widespread commercialization of fourth generation (4G) wireless systems, such as a Long Term Evolution (LTE) system or an LTE-Advanced (LTE-A) system standardized by the 3rd Generation Partnership Project (3GPP), next generation wireless systems are being developed. One such system, by the 3GPP, is a fifth generation (5G) or New Radio (NR) wireless system.

To meet demand for higher data rates, wireless systems anticipate using presently unlicensed spectrum bands. High frequency bands (e.g. millimeter wave) can provide high data rates, but signal power may decrease quicker as signals propagate as compared to lower band systems. To provide a wider coverage area, beamforming techniques may be utilized at both a base station side and a user equipment (UE) side.

In wireless propagation, especially indoors, reflections are present. Even if the physical directions from a UE to two transmit/receive points (TRP) are widely different, reflections may anyway lead to leakage among TRP signals at the UE; such leakage will play the role as interference. At high signal to noise ratios, the system is not noise limited, but interference limited. Sometimes, the signals may interfere with each other. In the UE's beamforming direction towards a first TRP, it sometimes overhears parts of the transmission from a second TRP.

In view of the above, there is a need in the art for methods and systems which are able to manage such interference between beams to reduce or manage interference.

SUMMARY

The disclosed approach provides a method of managing interference in a communication network. The method includes transmitting a first downlink signal from a first TRP to an electronic device using a beam with a first angle of departure (AoD). The first TRP then receives a first uplink pilot signal from the electronic device, the first uplink pilot signal received at the first TRP at an angle of arrival (AoA) corresponding with the first AoD. The first TRP then receives a second uplink pilot signal from the electronic device, the second uplink pilot signal associated with an uplink AoD defined with respect to the electronic device, that corresponds to a second downlink signal received at the electronic device from a second TRP. From receiving the first and second uplink pilot signals, the first TRP can then estimate the AoD for the intended signal (first downlink signal), and the AoD for the interference signal. The first TRP can then reconfigure the beam used to transmit the first downlink signal based on the estimated first angle of departure and estimated second angle of departure to manage the interference effect that the first downlink signal has on the second downlink signal.

According to one aspect of the disclosure, a method of managing interference in a wireless communication network is performed by a first transmit-receive point (TRP) of the wireless communication network, and includes transmitting a first downlink signal to an electronic device using a transmission beam, the first downlink signal having a first downlink angle of departure (AoD) defined with respect to the first TRP; receiving a first uplink pilot signal from the electronic device, wherein a first Angle of Arrival (AoA) of the first uplink pilot signal, defined with respect to the first TRP, is associated with the first downlink AoD; receiving a second uplink pilot signal from the electronic device, the second uplink pilot signal associated with an uplink AoD defined with respect to the electronic device, that corresponds to a second downlink signal received at the electronic device from a second TRP of the wireless communication network and a first leakage signal resulting from the transmission beam; and reconfiguring the transmission beam to alter the first leakage signal based on the received first uplink pilot signal and the received second uplink pilot signal.

According to one embodiment of the method, the method further includes estimating the first AoA based on receiving the first uplink pilot signal; estimating a second AoA based on receiving the second uplink pilot signal; and reconfiguring the transmission beam used to transmit the first downlink signal based on the estimated first AoA and the estimated second AoA.

According to one embodiment of the method, the method further includes receiving an indication from the electronic device that a portion of the first downlink signal is interfering with the second downlink signal.

According to one embodiment of the method, the method further includes scheduling resources, in response to receiving the indication, for an uplink pilot signal scan from the electronic device. The resources account for at least the first uplink pilot signal and the second uplink pilot signal.

According to one embodiment of the method, the method further includes communicating the resources to the second TRP.

According to one embodiment of the method, the beam is reconfigured to minimize interference of the second downlink signal from a portion of the first downlink signal.

According to one embodiment of the method, the first downlink signal and the second downlink signal are identical, and the beam is reconfigured to enhance a received signal at the electronic device. The received signal is a combination of a portion of the first downlink signal and the second downlink signal.

According to one embodiment of the method, the method further includes receiving at least a third uplink pilot signal corresponding to the uplink AoD. The transmission beam is reconfigured further based on receipt of the at least third uplink pilot signal.

According to one aspect of the disclosure, a method of managing interference by an electronic device in a wireless communication network includes receiving a first downlink signal from a first transmit-receive point (TRP) at a first angle of arrival (AoA); receiving a second downlink signal from a second TRP at a second AoA; determining an interference condition by determining that a portion of the first downlink signal is interfering with the second downlink signal at the second AoA; and transmitting a series of uplink pilot signals to the first TRP in response to determining the interference condition, to allow the first TRP to determine a downlink angle of departure (AoD) associated with the second AoA.

According to one embodiment of the method, the method further includes transmitting an indication of the interference condition to at least one of the first TRP or the second TRP.

According to one embodiment of the method, the method further includes transmitting an identity of the first TRP to the second TRP; and transmitting an identity of the second TRP to the first TRP.

According to one embodiment of the method, transmitting the series of uplink pilot signals includes transmitting a first uplink pilot signal to the first TRP at a first uplink AoD corresponding with the first AoA; and transmitting a second uplink pilot signal to the first TRP at a second uplink AoD corresponding with the second AoA.

According to one embodiment of the method, transmitting the series of uplink pilot signals further includes transmitting at least a third uplink pilot signal to the first TRP at one of the first uplink AoD or the second uplink AoD.

DETAILED DESCRIPTION OF EMBODIMENTS

Introduction

Figure 1:
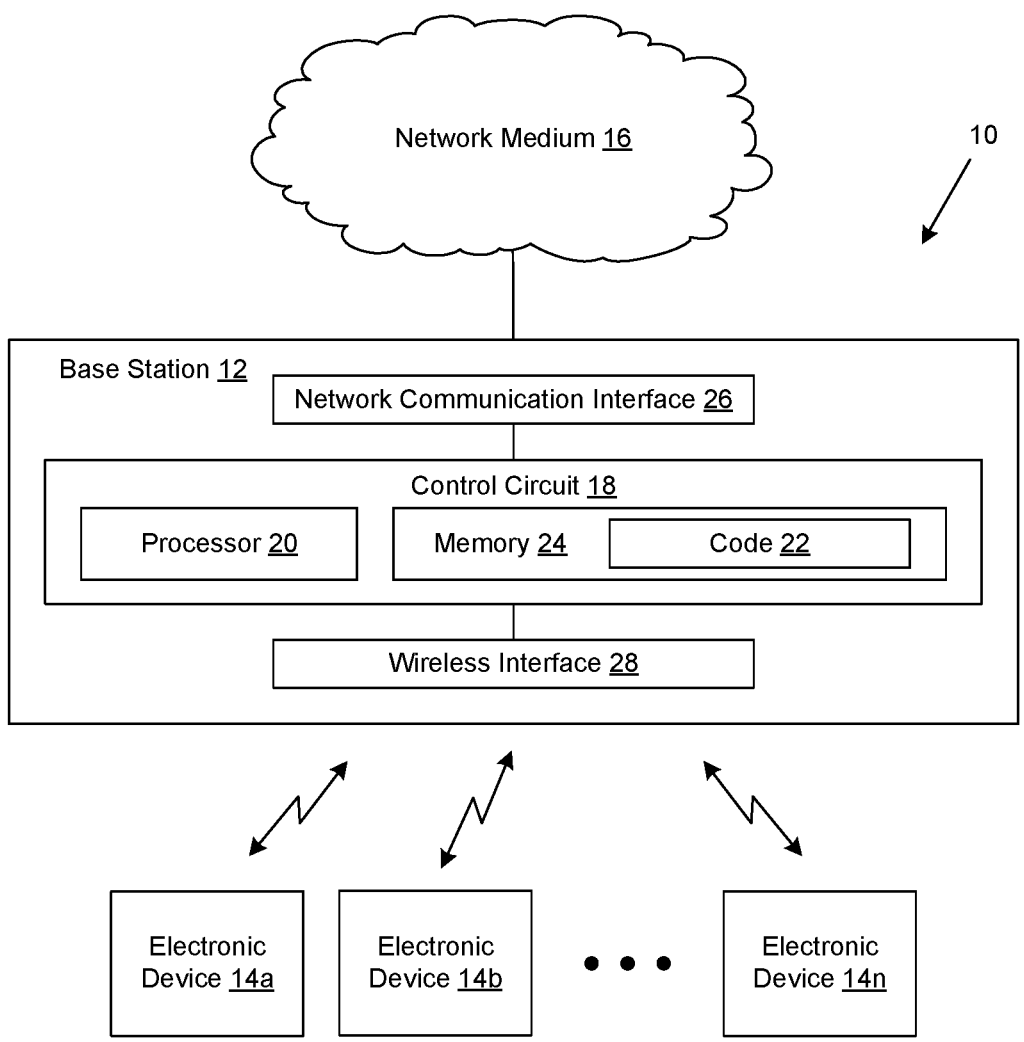
FIG. 1 is a schematic block diagram of a network system that utilizes interference management for multi-TRP wireless radio communications.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Described below, in conjunction with the appended figures, are various embodiments of systems and methods for managing interference between two signals transmitted to a single electronic device in a wireless network. An interference management procedure may be carried out by the respective devices in an automated manner to detect interference between two signals, trigger the interference management methods, and either decrease the impact of the interference or increase the benefit from the interference.

System Architecture

FIG. 1 is a schematic diagram of an exemplary network system 10 for implementing the disclosed techniques. It will be appreciated that the illustrated system is representative and other systems may be used to implement the disclosed techniques. The exemplary network system 10 includes a base station 12 that operates in accordance with a cellular protocol, such as a protocol promulgated by 3GPP or another standard. For instance, the network system 10 may operate in accordance with LTE, LTE-A, or a 5G NR standards. However, it is to be appreciated that the techniques described herein can be applied to substantially any wireless communication system that utilizes beamforming techniques or multiple beams between respective devices.

The network system 10 of the illustrated example supports cellular-type protocols, which may include circuit-switched network technologies and/or packet-switched network technologies. The network system 10 includes a base station 12 that services one or more electronic devices 14, designated as electronic devices 14a through 14n in FIG. 1. The base station 12 may support communications between the electronic devices 14 and a network medium 16 through which the electronic devices 14 may communicate with other electronic devices 14, servers, devices on the Internet, etc. The base station 12 may be an access point, an evolved NodeB (eNB) in a 4G network or a next generation NodeB (gNB) in a 5G or NR network as well as a second terminal (e.g. device to device communications). As utilized herein, the term "base station" may refer, generally, to any device that services user devices and enables communications between the user devices and the network medium or a second device and, thus, includes the specific examples above depending on the network implementation. It should be appreciated that while the term "base station" is used with regards to embodiments disclosed herein, the electronic device may communicate with any type of network node according to the disclosed embodiments, including, but not limited to, a second electronic device or a different type of network element.

In one embodiment, the network system 10 supports beamforming operations between the base station 12 and the electronic devices 14 such that the base station 12 can transmit using one or more beams (generated with beamforming techniques, for example) and the electronic devices 14 can receive using one or more reception beams from either a single base station 12 or a plurality of base stations. The base station 12 may retransmit certain messages using an available transmit beam, which is referred to as beam sweeping. In particular, such beam sweeping may occur when the base station 12 communicates information to electronic devices 14 before establishing a specific, known beam for each electronic device 14. For example, beam sweeping may be used to dynamically determine current channel conditions.

The base station 12 may include operational components for carrying out the wireless communications, the interference management functions described herein and other functions of the base station 12. For instance, the base station 12 may include a control circuit 18 that is responsible for overall operation of the base station 12, including controlling the base station 12 to carry out the operations described in greater detail below. The control circuit 18 includes a processor 20 that executes code 22, such as an operating system and/or other applications. The functions described in this disclosure document may be embodied as part of the code 22 or as part of other dedicated logical operations of the base station 12. The logical functions and/or hardware of the base station 12 may be implemented in other manners depending on the nature and configuration of the base station 12. Therefore, the illustrated and described approaches are just examples and other approaches may be used including, but not limited to, the control circuit 18 being implemented as, or including, hardware (e.g., a microprocessor, microcontroller, central processing unit (CPU), etc.) or a combination of hardware and software (e.g., a system-on-chip (SoC), an application-specific integrated circuit (ASIC), etc.).

The code 22 and any stored data (e.g., data associated with the operation of the base station 12) may be stored on a memory 24. The code may be embodied in the form of executable logic routines (e.g., a software program) that is stored as a computer program product on a non-transitory computer readable medium (e.g., the memory 24) of the base station 12 and is executed by the processor 20. The functions described as being carried out by the base station 12 may be thought of as methods that are carried out by the base station 12.

The memory 24 may be, for example, one or more of a buffer, a flash memory, a hard drive, a removable media, a volatile memory, a non-volatile memory, a random access memory (RAM), or other suitable device. In a typical arrangement, the memory 24 includes a non-volatile memory for long term data storage and a volatile memory that functions as system memory for the control circuit 18. The memory 24 is considered a non-transitory computer readable medium.

The base station 12 includes communications circuitry that enables the base station 12 to establish various communication connections. For instance, the base station 12 may have a network communication interface 26 to communicate with the network medium 16. Also, the base station 12 may have a wireless interface 28 over which wireless communications are conducted with the electronic devices 14, including the multi-beam operations and procedures described herein. The wireless interface 28 may include a radio circuit having one or more radio frequency transceivers (also referred to as a modem), one or more antenna assemblies, and any appropriate tuners, impedance matching circuits, and any other components needed for the various supported frequency bands and radio access technologies.

The electronic devices 14 serviced by the base station 12 may be user devices (also known as user equipment or UEs) or machine-type devices. Exemplary electronic devices 14 include, but are not limited to, mobile radiotelephones ("smartphones"), tablet computing devices, computers, a device that uses machine-type communications, machine-to-machine (M2M) communications or device-to-device (D2D) communication (e.g., a sensor, a machine controller, an appliance, etc.), a camera, a media player, or any other device that conducts wireless communications with the base station 12.

Figure 2:
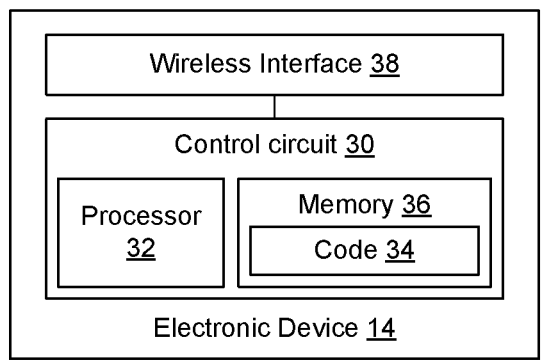
FIG. 2 is a schematic block diagram of communication device that forms part of the network system of FIG. 1.

As shown in FIG. 2, each electronic device 14 may include operational components for carrying out the wireless communications, the interference management functions described herein and other functions of the electronic device 14. For instance, among other components, each electronic device 14 may include a control circuit 30 that is responsible for overall operation of the electronic device 14, including controlling the electronic device 14 to carry out the operations described in greater detail below. The control circuit 30 includes a processor 32 that executes code 34, such as an operating system and/or other applications. The functions described in this disclosure document may be embodied as part of the code 34 or as part of other dedicated logical operations of the electronic device 14. The logical functions and/or hardware of the electronic device 14 may be implemented in other manners depending on the nature and configuration of the electronic device 14. Therefore, the illustrated and described approaches are just examples and other approaches may be used including, but not limited to, the control circuit 30 being implemented as, or including, hardware (e.g., a microprocessor, microcontroller, central processing unit (CPU), etc.) or a combination of hardware and software (e.g., a system-on-chip (SoC), an application-specific integrated circuit (ASIC), etc.).

The code 34 and any stored data (e.g., data associated with the operation of the electronic device 14) may be stored on a memory 36. The code 34 may be embodied in the form of executable logic routines (e.g., a software program) that is stored as a computer program product on a non-transitory computer readable medium (e.g., the memory 36) of the electronic device 14 and is executed by the processor 32. The functions described as being carried out by the electronic device 14 may be thought of as methods that are carried out by the electronic device 14.

The memory 36 may be, for example, one or more of a buffer, a flash memory, a hard drive, a removable media, a volatile memory, a non-volatile memory, a random access memory (RAM), or other suitable device. In a typical arrangement, the memory 36 includes a non-volatile memory for long term data storage and a volatile memory that functions as system memory for the control circuit 30. The memory 36 is considered a non-transitory computer readable medium.

The electronic device 14 includes communications circuitry that enables the electronic device 14 to establish various communication connections. For instance, the electronic device 14 may have a wireless interface 38 over which wireless communications are conducted with the base station 12, including the beamforming operations and procedures described herein. The wireless interface 38 may include a radio circuit having one or more radio frequency transceivers (also referred to as a modem), at least one antenna assembly, and any appropriate tuners, impedance matching circuits, and any other components needed for the various supported frequency bands and radio access technologies.

Other components of the electronic device 14 may include, but are not limited to, user inputs (e.g., buttons, keypads, touch surfaces, etc.), a display, a microphone, a speaker, a camera, a sensor, a jack or electrical connector, a rechargeable battery and power supply unit, a SIM card, a motion sensor (e.g., accelerometer or gyro), a GPS receiver, and any other appropriate components.

Procedures for Managing Interference in Multi-TRP Systems

Figure 3:
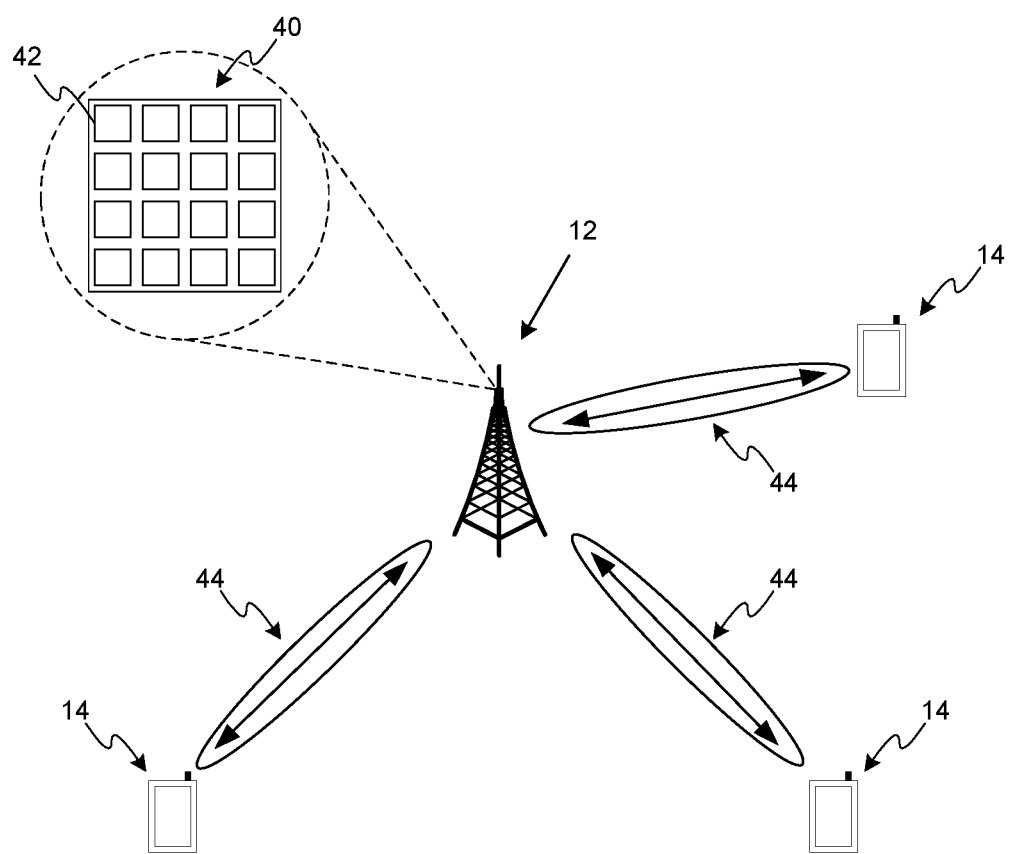
FIG. 3 is a schematic diagram of the network system of FIG. 1 according to an aspect.

With reference to FIG. 3, network system 10 may support beam forming techniques. Base station 12 may include a large antenna array 40 comprising individual antenna elements 42. In an aspect, each antenna element 42 may be coupled to a respective radio chain of base station 12. The base station 12 may use beam forming techniques with the antenna array 40 to generate and transmit one or more beams 44 directed to electronic devices 14.

Figure 4:
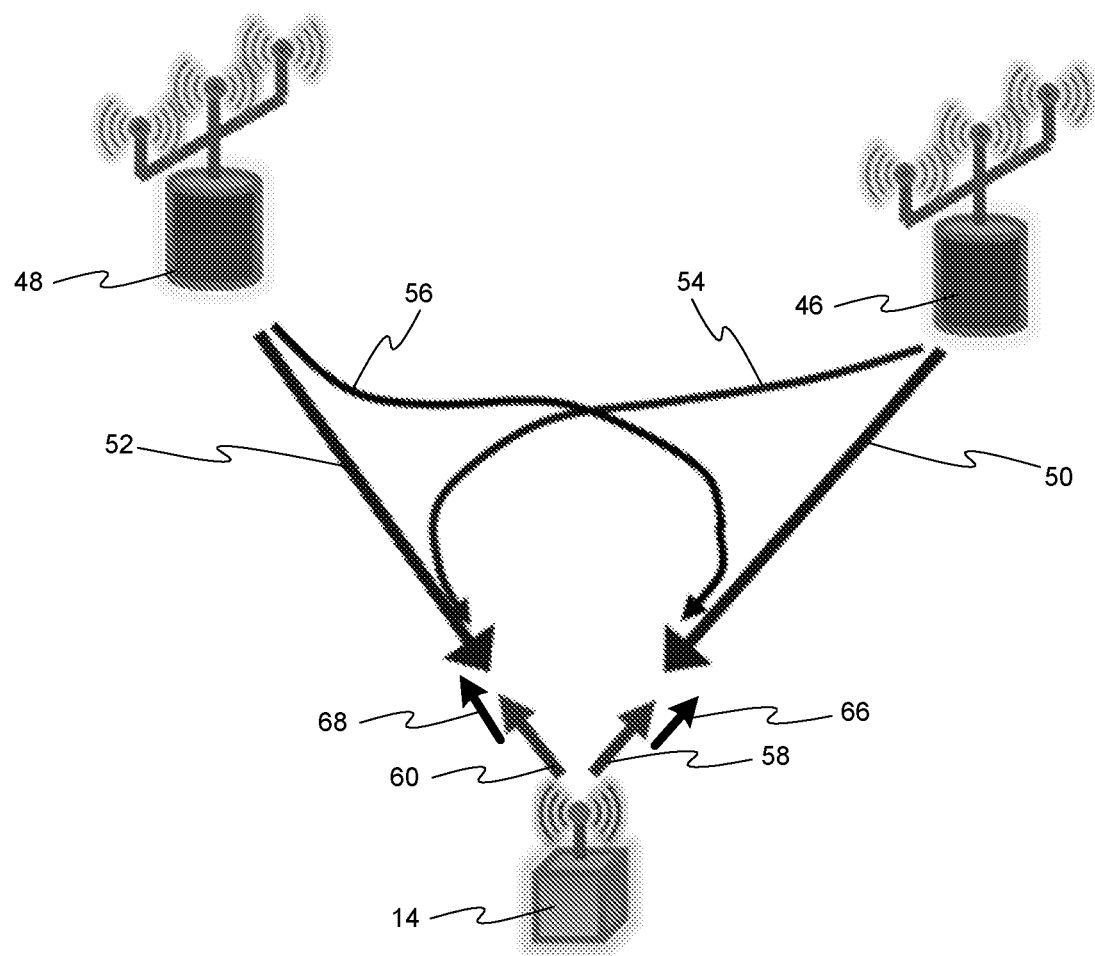
FIG. 4 is a schematic diagram of multi-TRP communications with an electronic device.

Turning now to FIG. 4, a first Transmit/Receive Point (TRP) 46 and a second TRP 48 can both communicate with an electronic device 14. A transmit/receive point (TRP) can be a network element, such as an antenna array 40, that is attached to a base station 12 or separate from a base station 12, but in communication with a base station 12 or otherwise in communication with the network. The first TRP 46 communicates with the electronic device 14 over a first downlink signal 50 and the second TRP 48 communicates with the electronic device 14 over a second downlink signal 52. Due to signal reflections caused by environmental objects such as terrain, buildings, trees, interior walls, etc., the downlink signals transmitted by the TRPs 46, 48 can split into leakage signals. For example, the first downlink signal 50 can have a first leakage signal 54 and the second downlink signal 52 can have a second leakage signal 56. In certain situations, the first leakage signal 54 can interfere with the second downlink signal 52 by leaking into the second receive beam 60 intended to receive the second downlink signal 52. Similarly, the second leakage signal 56 can interfere with the first downlink signal 50 by leaking into the first receive beam 58 intended to receive the first downlink signal 52. It should be appreciated that the leakage signals 54, 56 are not separately generated signals, but are comprised of their respective downlink signal. For instance, the first leakage signal 54 is a portion of the first downlink signal 50 that travels along a leakage path, and the second leakage signal 56 is a portion of the second downlink signal 52 that travels along a leakage path.

Figure 5:
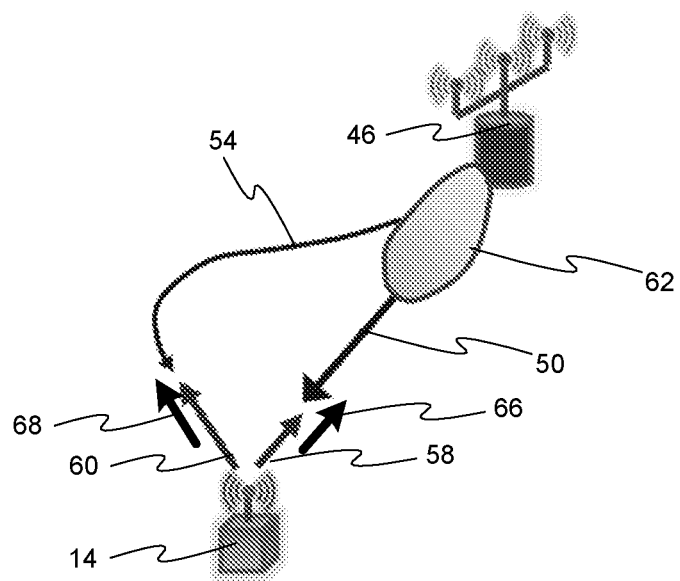
FIG. 5 is a schematic diagram of an exemplary embodiment of a TRP communicating with an electronic device.
Figure 6:
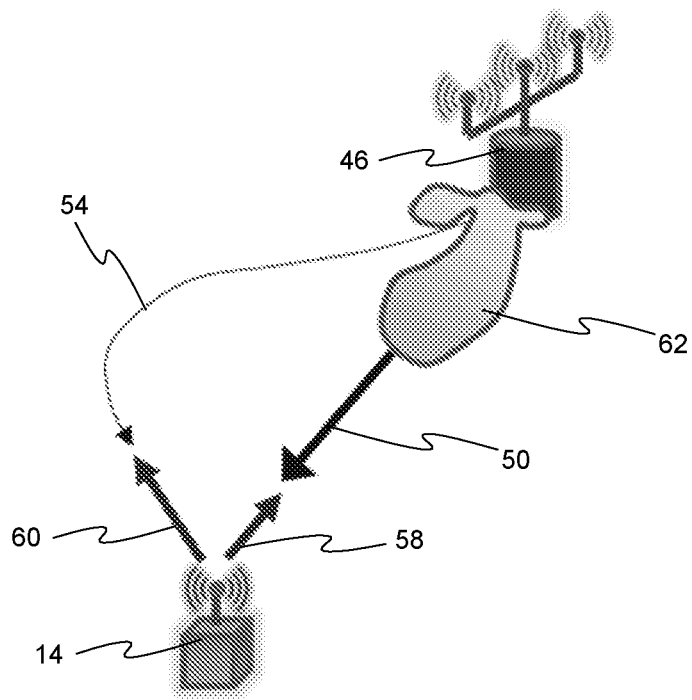
FIG. 6 is a schematic diagram of an exemplary embodiment of a TRP communicating with an electronic device.

In the case shown in FIG. 5, it would be beneficial for the electronic device 14 if the first TRP 46 could re-design its beam 62 that transmits the first downlink signal 50, so that the beam 62 is radiating less signal in the direction that will leak into the electronic device's 14 second receive beam 60 intended for the second TRP 48. It should be appreciated that while FIG. 5 depicts only the first TRP 46, this disclosed method can be performed with respect to a second TRP 48 or any additional TRP communicating with the electronic device 14. To reconfigure the beam requires the first TRP 46 to possess knowledge about the angles of departure (AoDs) of the intended direction of the first downlink signal and the interference direction corresponding to the angle of arrival (AoA) of the electronic device's 14 second receive beam 60 intended to receive the second downlink signal 54. When the first TRP 46 acquires knowledge about the AoDs of the intended direction of the first downlink signal, and the interference direction, the first TRP 46 can reconfigure the beam 62 used to transmit the first downlink signal 50 so that the beam 62 radiates less signal in the direction that will leak into the electronic device's 14 second receive beam 60. The reconfigured beam 62 would decrease the amplitude of the first leakage signal 54 as shown in FIG. 6.

The TRP 46, 48 can obtain the necessary AoD information in the uplink, provided that the channel used to communicate with the electronic device 14 is reciprocal in direction, and further, the TRP 46, 48 can receive the uplink signal that forms the basis of estimating the AoDs in different beams. In the uplink, Sounding Reference Symbols (SRS) are already vital for the system since they must be used by the TRP to estimate the channel to the electronic device 14 in the intended direction. If the TRP 46, 48 switches to another beam during the uplink transmission of SRS, then it can estimate the interference direction, but it will not be able to estimate the channel in the actual beam that will be used for data transmission/reception. To overcome this issue, the electronic device 14 can perform the necessary beam sweep at various uplink AoDs so that the corresponding TRP 46, 48 does not need to switch to another beam during the uplink transmissions of the SRS.

Figure 7:
FIG. 7 is an exemplary resource block.

One way to communicate the information needed by the TRP 46, 48 to estimate the interference direction is to introduce additional SRS symbols solely for the purpose of allowing the TRP 46, 48 to estimate the AoDs. An exemplary resource block 64 used for the uplink pilot signal sweep from the electronic device 14 is shown in FIG. 7. The resource block 64 includes the time domain on the horizontal axis and the frequency domain on the vertical axis. The SRSs are included in the time domain, but it should be appreciated that other embodiments of the resource block 64 may include the SRSs in the frequency domain. $SRS_1$ and $SRS_2$ correspond to an uplink pilot signal having an AoD corresponding to the first receive beam 58 and an uplink pilot signal having an AoD corresponding to the second receive beam 60.

In the channel estimation procedure at the TRPs 46, 48, the TRP may only estimate a single AoA at a time. Therefore, the TRP 46, 48 cannot estimate the desired and the leakage signal directions from the electronic device 14 simultaneously. To address this, additional SRSs may be included in the resource block 64 as indicated by $SRS_{AoD,1}$, $SRS_{AoD,2}$, and $SRS_{AoD,k}$. The additional SRSs are included to allow the TRP 46, 48 to estimate the AoAs at the TRP 46, 48, and allow the TRP 46, 48 to estimate the channels in two directions. It should be appreciated that the exact location of the added SRS signals in the resource block 64 is irrelevant, and that the number of them is adjustable. The additional SRS signals appear in pairs in situations where the electronic device 14 has two receive beams 58, 60, one for each TRP 46, 48, respectively, but to allow the TRPs to make a high precision estimate of the AoDs, it may be beneficial for the TRP to sweep a number, K, of beams. In theory, K can be as low as 1, but the larger the number the better the AoD estimation.

In one example, the electronic device 14 can transmit a first uplink pilot signal 66 at a first uplink AoD, defined with respect to the electronic device 14, in the direction of the first downlink signal 50 (desired signal). The first uplink AoD can correspond to the first AoA of the first downlink signal 50 (defined with respect to the electronic device 14) such that the first uplink AoD equals the first AoA of the downlink signal 50. The first TRP 46 receives the first uplink pilot signal 66, which it can use to estimate the channel conditions for the first downlink signal 50. The electronic device 14 can also transmit a second uplink pilot signal 68 at a second AoD, defined with respect to the electronic device 14, in the direction of the first leakage signal 54 (interference signal), which also coincides with the direction of the second downlink signal 52 from the second TRP 48. The second uplink AoD can correspond to the second AoA of the second downlink signal 52 (defined with respect to the electronic device 14) such that the second uplink AoD equals the second AoA of the second downlink signal 52. The first TRP 46 receives the second uplink pilot signal 68. Using the received second uplink pilot signal 68, the first TRP 46 can determine that the beam 62 used to transmit the first downlink signal 50 is also causing interference with the second downlink signal 52 by way of the leakage signal 54. The first TRP 46 can then reconfigure its beam 62 to prevent or reduce the first leakage signal 54, and in turn, reduce the interference of the second downlink signal 52.

Additional uplink pilot signals can be transmitted to the first TRP 46 in the direction of the first downlink signal 50 and/or in the direction of the second downlink signal 52 to allow the first TRP 46 to better detect or discover the signal channel direction on which a downlink signal creates interference on another channel. For example, in certain embodiments, the electronic device 14 can also transmit a third uplink pilot signal 68 at the second AoD, defined with respect to the electronic device 14, in the direction of the first leakage signal 54 (interference signal), which also coincides with the direction of the second downlink signal 52 from the second TRP 48. As described above, the second uplink AoD can correspond to the second AoA of the second downlink signal 52 (defined with respect to the electronic device 14) such that the second uplink AoD equals the second AoA of the second downlink signal 52. The first TRP 46 can then reconfigure its beam 62 further based on receipt of the third uplink pilot signal.

The configuration of SRS signals can be flexible. For example, the additional SRSs may not always appear in pairs in certain situations such as when only one TRP causes the interference, or the system simply decides to reduce the overhead cost when the interference level is not critical, etc.

In certain embodiments, the electronic device 14 can assess the interference situation and request to execute the interference management procedure described above. The electronic device 14 may, for example, observe low signal to inference ratio (SINR) values, or obtain the channel gains of both desired signals 50, 52 and interference signals 54, 56, and then base its actions accordingly. The report to the TRP(s) 46, 48 can be an indication of the interference condition, a request to execute the interference management procedure, or more elaborate information such as the SINR values. The electronic device 14 can also transmit an identity of the first TRP 46 to the second TRP 48, and/or an identity of the second TRP 48 to the first TRP 46. This allows the TRPs 46, 48 to discuss a common scheduling where the second TRP 48, for example, can get access to the uplink pilot resources intended for, and scheduled by, the first TRP 46. After the first TRP 46 communicates the scheduled resources to the second TRP 48, the second TRP can re-use the scheduled resources or it can at least be aware of the resources in its direction that are intended for the first TRP 46 to allow the first TRP 46 to determine the interference or leakage path.

Likewise, the procedure can also be initiated by one of the TRPs 46, 48. For example, the TRP 46, 48 can make the decision to initiate the interference management procedure based on observations that the link quality is not as good as expected. Such initiation can begin inter-TRP communication to communicate the initiation of the interference management procedure from one TRP to the other, but may also involve one TRP requesting the procedure, and then the electronic device 14 can inform the other TRP that it will take place.

Figure 8:
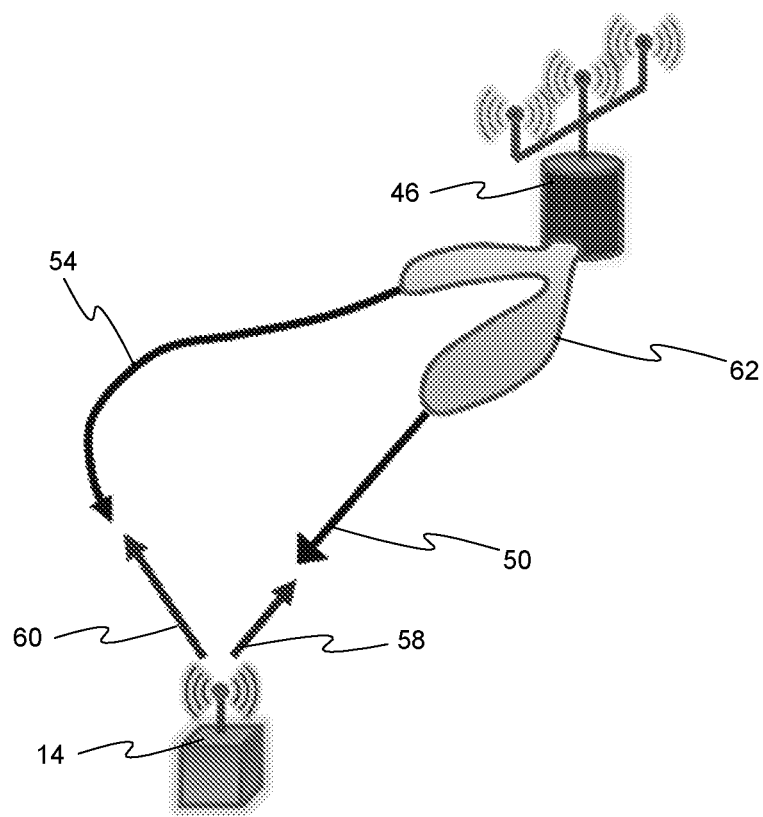
FIG. 8 is a schematic diagram of an exemplary embodiment of a TRP communicating with an electronic device.

Turning now to FIG. 8, in situations where both TRPs 46, 48 are transmitting the same data signal to the electronic device 14, the electronic device 14 can inform the TRPs 46, 48 about the relative phase differences of the first channel (e.g. to/from first TRP 46) and the second channel (e.g. to/from second TRP 48). By doing so, the TRPs 46, 48 can adjust their beams 62 that transmit the signals 50, 52 in a way so that the leakage signals and the downlink signals add up constructively at the electronic device 14. Alternatively, the electronic device 14 (or TRPs 46, 48) can request the interference management procedure to be executed, thereby allowing the TRPs 46, 48 to beamform in the direction of both the desired direction and the interfering direction as shown in FIG. 8.

Figure 9:
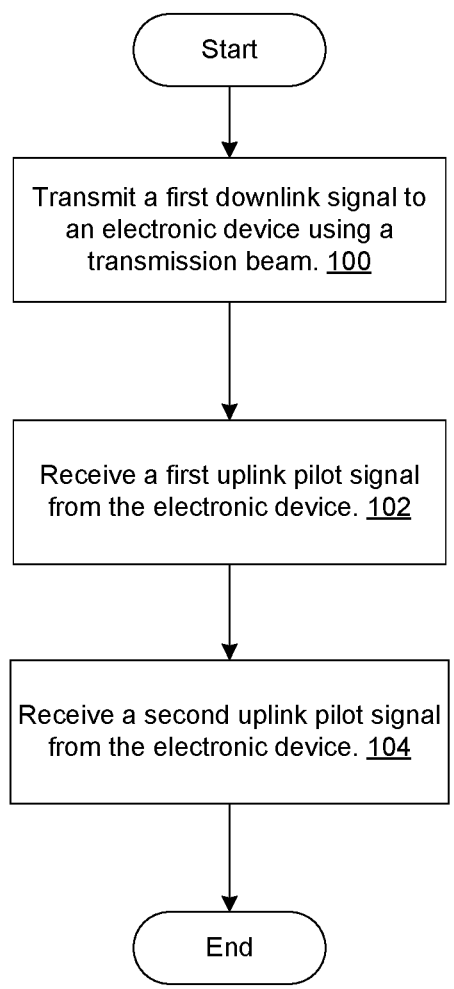
FIG. 9 is a flow chart describing an exemplary method.

Turning now to FIG. 9, a method of managing interference in a wireless communication network by a network element is described. It should be appreciated that the methods or functions described as being performed by the first TRP 46 may also be performed respectively by the second TRP 48, alone or simultaneously. At reference numeral 100, the network element (e.g. the first TRP 46) transmits a first downlink signal 50 to an electronic device 14 using a transmission beam 62. The first downlink signal 50 has a first downlink angle of departure defined with respect to a first transmit-receive point (TRP) 46. At reference numeral 102, the network element receives a first uplink pilot signal 66 from the electronic device 14. The first uplink pilot signal 66 is received at the first TRP 46 at a first angle of arrival (AoA), defined with respect to the first TRP 46, that is associated with the first downlink AoD. At reference numeral 104, the network element receives a second uplink pilot signal 68 from the electronic device 14. The second uplink pilot signal 68 is associated with an uplink AoD defined with respect to the electronic device 14, that corresponds to a second downlink signal received at the electronic device 14 from a second TRP 48 of the wireless communication network.

Figure 10:
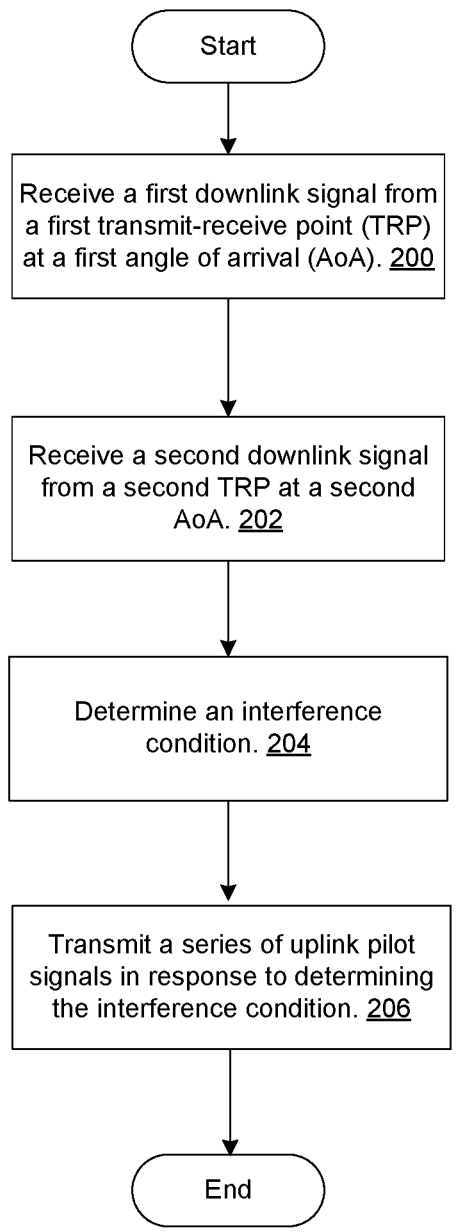
FIG. 10 is a flow chart describing an exemplary method.

Turning now to FIG. 10, a method of managing interference by an electronic device 14 in a wireless communication network is described. It should be appreciated that the methods or functions described as being performed by the first TRP 46 may also be performed respectively by the second TRP 48, alone or simultaneously. At reference numeral 200, the electronic device 14 receives a first downlink signal 50 from a first TRP 46 at a first angle of arrival (AoA). At reference numeral 202, the electronic device 14 receives a second downlink signal 52 from a second TRP 48 at a second AoA. At reference numeral 204, the electronic device 14 determines an interference condition by determining that a first leakage signal 54 from the first TRP 46 is interfering with the second downlink signal 52 at the second AoA. At reference numeral 206, the electronic device 14 transmits a series of uplink pilot signals 66, 68 in response to determining the interference condition. The electronic device 14 transmits the series of uplink pilot signals 66, 68 to allow the first TRP 46 to estimate a downlink AoD associated with the second AoA.

CONCLUSION

Although certain embodiments have been shown and described, it is understood that equivalents and modifications falling within the scope of the appended claims will occur to others who are skilled in the art upon the reading and understanding of this specification.

What is claimed is:

1. A method of managing interference in a wireless communication network, the method performed by a first transmit-receive point (TRP) of the wireless communication network, and comprising:

transmitting a first downlink signal to an electronic device using a transmission beam, the first downlink signal having a first downlink angle of departure defined with respect to the first TRP;

receiving a first uplink pilot signal from the electronic device, wherein a first Angle of Arrival (AoA) of the first uplink pilot signal, defined with respect to the first TRP, is associated with the first downlink AoD;

receiving a second uplink pilot signal from the electronic device, the second uplink pilot signal associated with an uplink AoD defined with respect to the electronic device, that corresponds to a second downlink signal received at the electronic device from a second TRP of the wireless communication network and a first leakage signal resulting from the transmission beam; and reconfiguring the transmission beam to alter the first leakage signal based on the received first uplink pilot signal and the received second uplink pilot signal.

2. The method of claim 1, further comprising:

estimating the first AoA based on receiving the first uplink pilot signal;

estimating a second AoA based on receiving the second uplink pilot signal; wherein reconfiguring the transmission beam is based on the estimated first AoA and the estimated second AoA.

3. The method of claim 2, wherein the first downlink signal and the second downlink signal are identical, and the transmission beam is reconfigured to enhance a received signal at the electronic device, wherein the received signal is a combination of the first leakage signal and the second downlink signal.

4. The method of claim 1, further comprising receiving an indication from the electronic device that a portion of the first downlink signal is interfering with the second downlink signal.

5. The method of claim 4, further comprising scheduling resources, in response to receiving the indication, for an uplink pilot signal scan from the electronic device, wherein the resources account for at least the first uplink pilot signal and the second uplink pilot signal.

6. The method of claim 5, further comprising communicating the resources to the second TRP.

7. The method of claim 1, wherein the transmission beam is reconfigured to minimize interference of the second downlink signal from the first leakage signal by preventing or reducing the first leakage signal.

8. The method of claim 1, further comprising:

receiving at least a third uplink pilot signal corresponding to the uplink AoD, wherein the transmission beam is reconfigured further based on receipt of the at least third uplink pilot signal.

9. A method of managing interference by an electronic device in a wireless communication network, the method comprising:

receiving a first downlink signal from a first transmit-receive point at a first angle of arrival (AoA);

receiving a second downlink signal from a second TRP at a second AoA;

determining an interference condition by determining that a portion of the first downlink signal is interfering with the second downlink signal at the second AoA; and transmitting a series of uplink pilot signals to the first TRP in response to determining the interference condition, to allow the first TRP to determine a downlink angle of departure (AoD) associated with the second AoA, wherein transmitting the series of uplink pilot signals comprises:

transmitting a first uplink pilot signal to the first TRP at a first uplink AoD corresponding with the first AoA; and transmitting a second uplink pilot signal to the first TRP at a second uplink AoD corresponding with the second AoA.

10. The method of claim 9, further comprising:

transmitting an indication of the interference condition to at least one of the first TRP or the second TRP.

11. The method of claim 9, further comprising:

transmitting an identity of the first TRP to the second TRP; and transmitting an identity of the second TRP to the first TRP.

12. The method of claim 9, wherein transmitting the series of uplink pilot signals further comprises:

transmitting at least a third uplink pilot signal to the first TRP at one of the first uplink AoD or the second uplink AoD.

13. An electronic device comprising a wireless interface and a control circuit configured to control the electronic device to:

receive a first downlink signal from a first transmit-receive point (TRP) at a first angle of arrival (AoA);

receive a second downlink signal from a second TRP at a second AoA;

determine an interference condition by determining that a portion of the first downlink signal is interfering with the second downlink signal at the second AoA; and transmit a series of uplink pilot signals to the first TRP in response to determining the interference condition, to allow the first TRP to determine a downlink angle of departure (AoD) associated with the second AoA, wherein transmitting the series of uplink pilot signals comprises:

transmitting a first uplink pilot signal to the first TRP at a first uplink AoD corresponding with the first AoA; and transmitting a second uplink pilot signal to the first TRP at a second uplink AoD corresponding with the second AoA.

14. The electronic device of claim 13, wherein the control circuit is further configured to control the electronic device to transmit an indication of the interference condition to at least one of the first TRP or the second TRP.

15. The electronic device of claim 13, wherein the control circuit is further configured to control the electronic device to:

transmit an identity of the first TRP to the second TRP; and transmit an identity of the second TRP to the first TRP.

16. The electronic device of claim 13, wherein transmitting the series of uplink pilot signals further comprises:

transmitting at least a third uplink pilot signal to the first TRP at one of the first uplink AoD or the second uplink AoD.

* * * * *